(12) United States Patent
Pai

(10) Patent No.: US 7,168,656 B2
(45) Date of Patent: Jan. 30, 2007

(54) LIGHTWEIGHT HELICOPTER

(75) Inventor: Bhaskar R Pai, Bangalore (IN)

(73) Assignee: Council of Scientific and Industrial Research, New Delhi (IN)

(*) Notice: Subject to any disclaimer, the term of this patent is extended or adjusted under 35 U.S.C. 154(b) by 173 days.

(21) Appl. No.: 11/062,946

(22) Filed: Feb. 22, 2005

(65) Prior Publication Data

US 2005/0211826 A1 Sep. 29, 2005

Related U.S. Application Data

(63) Continuation-in-part of application No. 10/380,904, filed as application No. PCT/IN01/00016 on Feb. 7, 2001, now abandoned.

(51) Int. Cl.
*B64C 27/10* (2006.01)
(52) U.S. Cl. .................................. 244/17.23
(58) Field of Classification Search ............ 244/17.23, 244/17.11, 2, 900
See application file for complete search history.

(56) References Cited

U.S. PATENT DOCUMENTS

| | | | |
|---|---|---|---|
| 2,192,881 A | 3/1940 | Bothezat |
| 2,461,348 A | 2/1949 | Pentecost |
| 2,835,331 A | 10/1958 | Ryan et al. |
| 2,938,679 A | 5/1960 | Walker, Jr. |
| 3,029,047 A | 4/1962 | Jacobsen et al. |
| 3,052,305 A | 9/1962 | Jones et al. |
| 3,261,572 A | 7/1966 | Gorton |
| 3,360,219 A | 12/1967 | Wigal |
| 4,372,506 A | 2/1983 | Cronk et al. |
| 4,458,860 A | 7/1984 | Ogawa |

(Continued)

FOREIGN PATENT DOCUMENTS

DE 78 903 A 1/1971

(Continued)

OTHER PUBLICATIONS

International Search Report, PCT/IN01/00016; ISA/EPO, Oct. 3, 2001.

*Primary Examiner*—Tien Dinh
(74) *Attorney, Agent, or Firm*—Harness, Dickey & Pierce, P.L.C.

(57) ABSTRACT

The present invention relates to a lightweight helicopter with features of coaxial, contra-rotating rotors and weight shift control. It has a rotary wing unit attached to a tricycle assembly through a hang bolt. The rotary wing unit has an engine mounted below a keel post, which drives a pair of contra-rotating coaxial rotors through a primary gearbox and a secondary gear box. The keel post is attached to a triangular control frame, the base of which forms the control bar. The keel post also supports a fuel tank connected to the engine and a tail plane having one or more articulated vertical flaps actuated by cables. The secondary gearbox is provided with a free-wheeling clutch, a pinion gear and bevel gears for transmitting the rotary movement of the engine to the counter rotating coaxial vertical shafts each carrying two rotor blades of airfoil cross section fixed by pitch bearing on teetering plates and teetering hinges to form horizontal rotors. The tricycle assembly has a pilot seat and landing gear as well as controls for operation of the engine, rotors, tail plane and landing gear. The directional control of the helicopter is achieved through the weight shift principle by manipulating the control bar, thereby causing a tilt of the contra-rotating rotors, which cause a corresponding tilt in the aerodynamic thrust of the rotors, propelling the helicopter in the required direction.

6 Claims, 7 Drawing Sheets

U.S. PATENT DOCUMENTS

| | | |
|---|---|---|
| 4,568,043 A | 2/1986 | Schmittle |
| 5,370,341 A | 12/1994 | Leon |
| 5,791,592 A | 8/1998 | Nolan et al. |
| 6,293,492 B1 | 9/2001 | Yanagisawa |
| 6,364,249 B1 | 4/2002 | Morgan et al. |

FOREIGN PATENT DOCUMENTS

| | | |
|---|---|---|
| DE | 37 29 231 A | 3/1989 |
| DE | 198 60 609 A | 7/2000 |
| FR | 2 620 106 A | 3/1989 |
| WO | 84 00339 A | 2/1984 |

…

LIGHTWEIGHT HELICOPTER

CROSS-REFERENCE TO RELATED APPLICATIONS

This application is a continuation-in-part of U.S. patent application Ser. No. 10/380,904 filed on Oct. 9, 2003 now abandoned, which is a National Stage of International Application Number PCT/IN01/00016, filed Feb. 7, 2001. The disclosures of the above applications are hereby incorporated by reference as if fully set forth herein.

FIELD OF THE INVENTION

The present invention relates to a lightweight helicopter.

BACKGROUND OF THE INVENTION

The present invention provides for a lightweight helicopter that is simple to operate and affordable for individuals or groups for purposes of aerosports and hobby flying. While a number of affordable aircraft, such as micro-lights and powered hang gliders, have brought the possibilities of powered flight within the reach of the public and lead to an upsurge in aerosports, the same is not true of the helicopter. The helicopter remains an expensive machine to acquire and difficult to learn to operate and to fly safely.

For example, a single seater powered hand glider manufactured in the Republic of India is available for about $4,500 (Rs. 2.0 lakhs) and requires about 10–15 hours instruction before an average person can fly solo. On the other hand, a recently introduced single seater ultralight helicopter, for example the Ultrasport 254 (American Sportscopter International Inc., Newport News, Va.) costs around $35,000 (Rs. 15 lakhs) in a kit form. The helicopter requires expensive training in a similar two-seat helicopter, which may require 100 hours and cost $13,700–$18,300 (Rs. 6–8 lakhs) for the training. This difference arises mainly due to the increased complexity of a conventional helicopter, which results in an expensive machine that is difficult to learn to fly. However, the ability of a helicopter for vertical as well as forward movement, makes it very attractive as a flying machine and would certainly prove to be very popular if made simple to fly and affordable.

Reference may be made to U.S. Pat. No. 5,370,341 issued Dec. 6, 1994 and entitled ultra-light helicopter and control system, which is hereby incorporated by reference as if fully set forth herein. The '341 patent consists of an ultra light helicopter with a pair of counter-rotating rotor assemblies. The pilot is suspended in a supine position in a hang glider type harness under the rotors. The pilot holds a control bar fixed to a frame and maneuvers the helicopter in pitch and roll directions by manipulating the control bar which results in the shift of his center of gravity relative to the center of gravity of the helicopter, thereby tilting the thrust axis of the rotors resulting in the maneuvering of the helicopter. The pilot also operates the engine throttle and pitch control mechanism of the rotor bladders with twist-grips formed on the control bar. With this control, he can control the vertical movement of the aircraft.

This invention has several drawbacks. One drawback being that the pilot is freely suspended in a prone position (i.e, face downward) under the downwash of the rotors, which is likely to lead to large swaying and buffeting of the pilot making it difficult to control the aircraft. In another drawback, the prone position is also considered to be extremely dangerous from a crash-worthiness point of view.

In an additional drawback, the absence of a positive control in the yaw direction in hover and low forward speeds could lead to undesirable spinning of the pilot about a vertical axis. It appears very difficult to introduce any further controls to overcome this problem, since both the hands of the pilot are fully occupied in manipulating the control bar, the rotor blade pitch control and the engine throttle and the pilots' feet are not available to carry out any control function because of the prone freely hanging position.

The use of two counter-rotating rotors is employed in some helicopters, such as for example, a Kamov helicopter of Russian origin and reported in Janes "Aircraft of the World." The use of counter-rotating concentric rotors has the advantage of having a zero net angular momentum thus avoiding the requirement of a tail rotor for torque balancing required in the single main rotor arrangement, as in the conventional helicopters. There is also a saving in power, which is normally consumed by the tail rotor of a conventional helicopter. However, due to the lower rotor being placed in the wake of the upper rotor, there is an interference effect, which results in an increase in the power required for a given thrust, thus nullifying to some extent, the savings in power of the tail rotor.

Another feature of the Kamov concentric contra-rotating rotors is the use of differential pitch control of the two rotors for achieving control in the yaw direction. This machine therefore needs a collective pitch, a cyclic pitch and differential pitch arrangements for its control. With all these features, the mechanical complexity is very high, leading to an expensive and complex machine.

We can estimate the size of the rotors based on the disk loading and power loading of lightweight machines in a similar class. With reference to FIG. 5, a plot is shown of these parameters for five helicopters. It would appear that ROSS-1 from '341 patent could turn out to be somewhat underpowered. HT-1 (1) and HT-1 (2) are present designs, one fitted with a 42-hp Rotax 477-2V engine and a 50 hp, Rotax 503-2V engine respectively. The weight estimates for each aircraft design indicates that the HT-1 (1) would weigh about 115 kg and HT-1 (2) would weigh about 127 kg. Thus, the HT-1 (1) could achieve the ultra-light category but it may be somewhat underpowered and the HT-1 (2) could have sufficient power but would not meet the ultra-light category weight limit.

SUMMARY OF THE INVENTION

The present invention relates to a lightweight helicopter with features of coaxial, contra-rotating rotors and weight shift control. It has a rotary wing unit attached to a tricycle assembly through a hang bolt. The rotary wing unit has an engine mounted below a keel post, which drives a pair of contra-rotating coaxial rotors through a primary gearbox and a secondary gear box. The keel post is attached to a triangular control frame, the base of which forms the control bar. The keel post also supports a fuel tank connected to the engine and a tail plane having one or more articulated vertical flaps actuated by cables. The secondary gearbox is provided with a free-wheeling clutch, a pinion gear and bevel gears for transmitting the rotary movement of the engine to the counter rotating coaxial vertical shafts each carrying two rotor blades of airfoil cross section fixed by pitch bearing on teetering plates and teetering hinges to form horizontal rotors. The tricycle assembly has a pilot seat and landing gear as well as controls for operation of the engine, rotors, tail plane and landing gear. The directional control of the helicopter is achieved through the weight shift principle by manipulating the control bar, thereby causing a tilt of the contra-rotating rotors, which cause a corresponding tilt in the aerodynamic thrust of the rotors, propelling the helicopter in the required direction.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE VARIOUS EMBODIMENTS

The following description of the various embodiments is merely exemplary in nature and is in no way intended to limit the invention, its application or uses.

Figure 1:
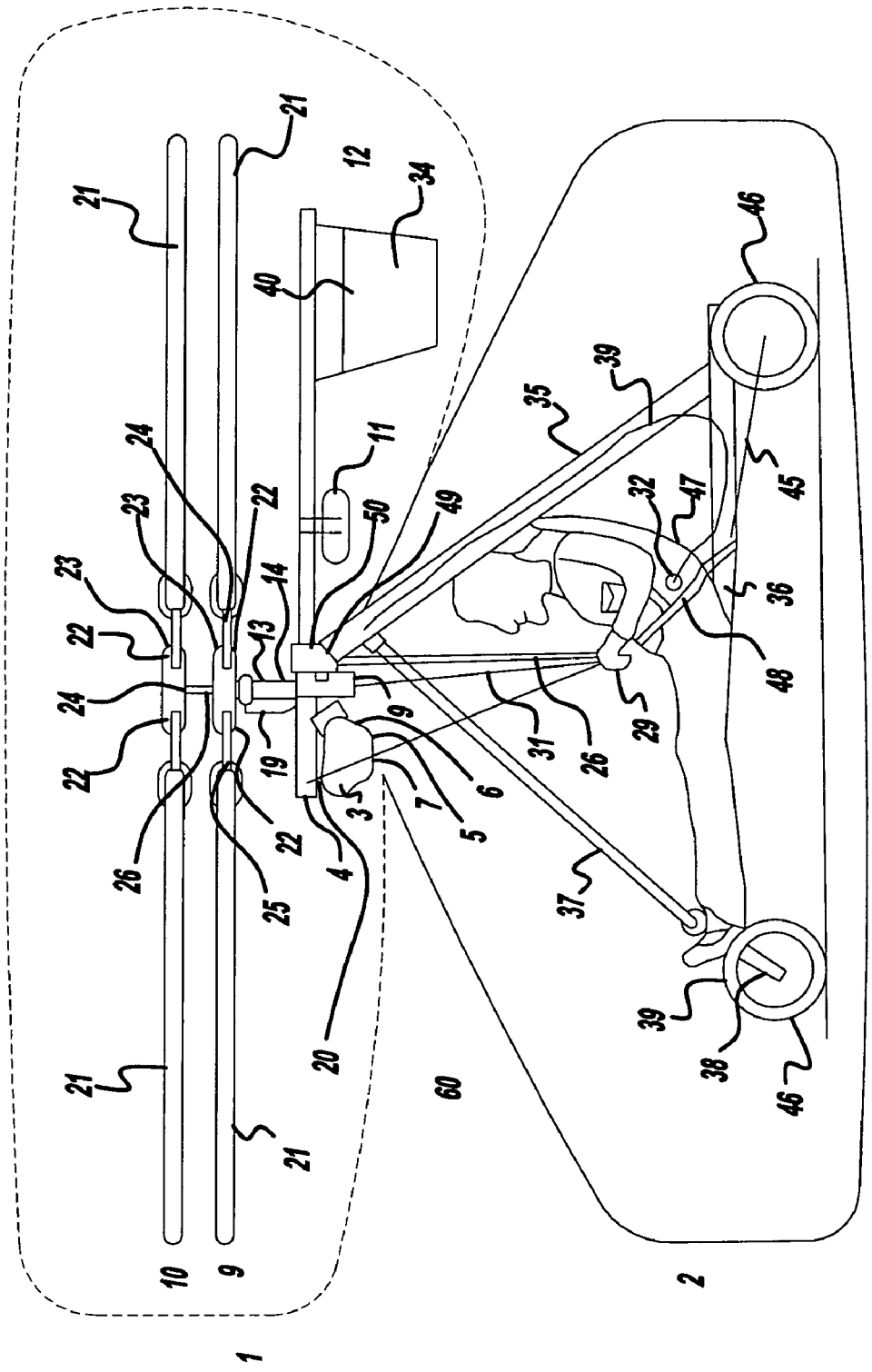
FIG. 1 shows the side view of a helitrike constructed in accordance with the teachings of the present invention.
Figure 2:
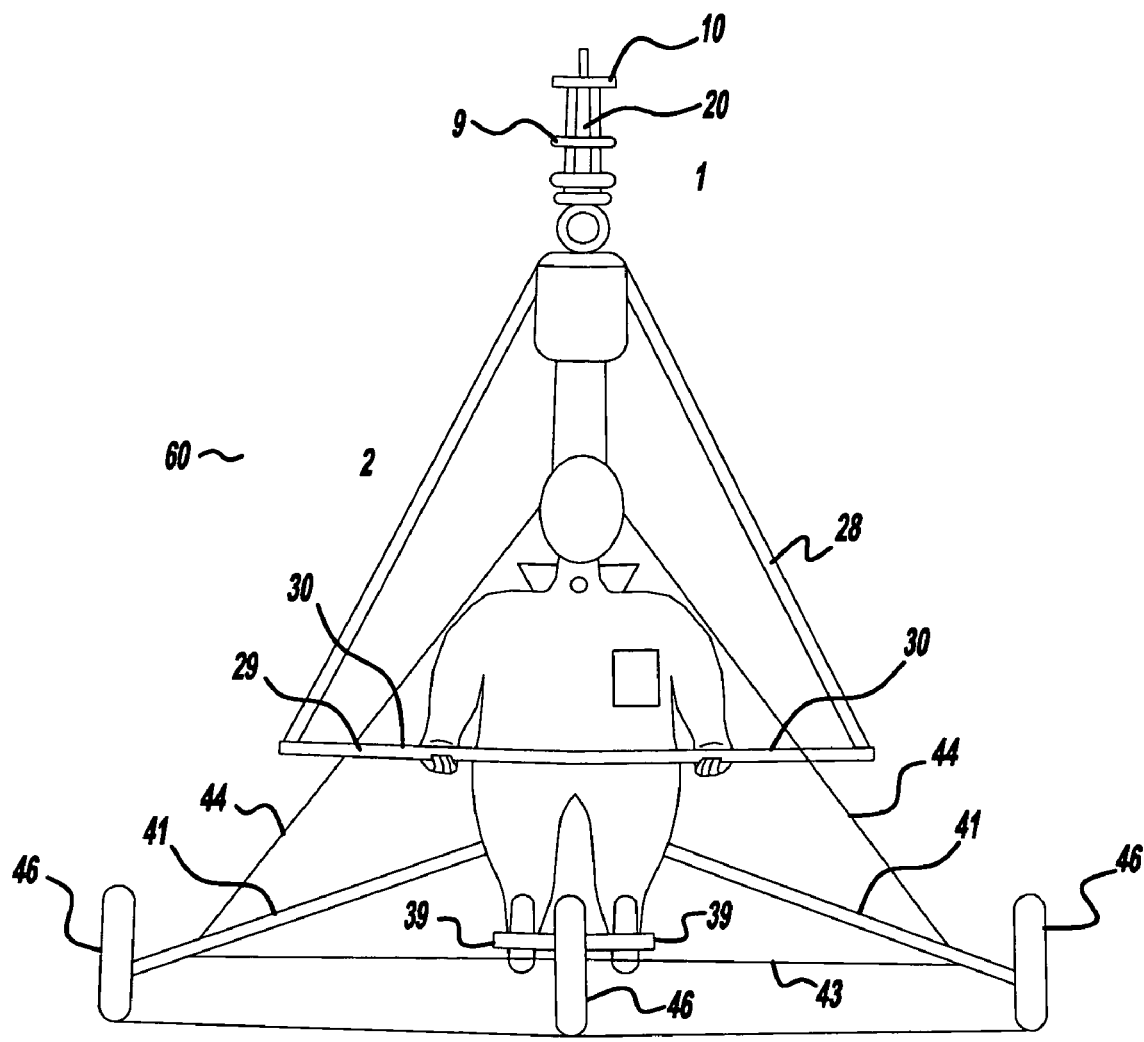
FIG. 2 is similar to FIG. 1 and shows the front view of helitrike.

The helicopter of the present invention, as shown in FIGS. 1 and 2, comprises a rotary wing assembly 1 and a tricycle assembly 2. The rotary wing assembly 1 comprises an engine 3 with a primary gearbox 4 connected through a flexible coupling 5 and a sprag clutch 6 to a secondary gearbox 7.

Figure 3:
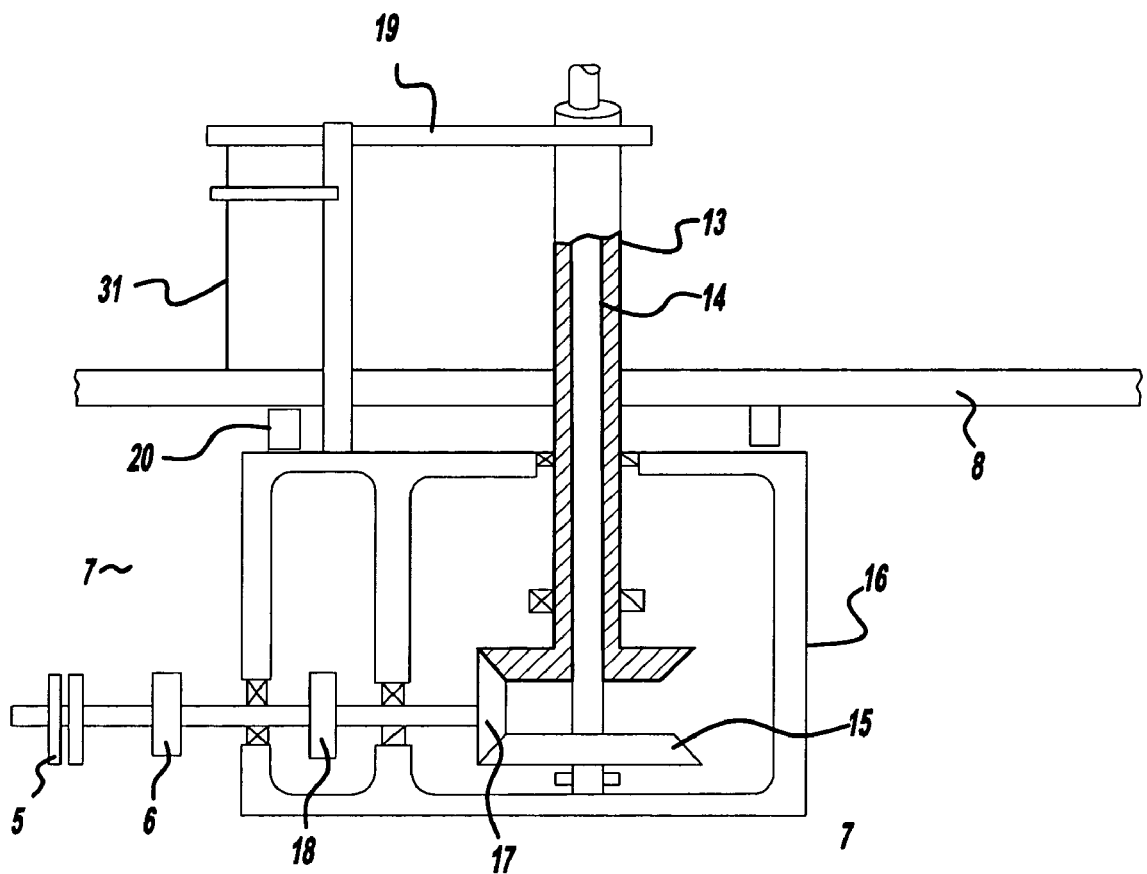
FIG. 3 shows a cross-sectional view of a secondary gearbox.
Figure 4:
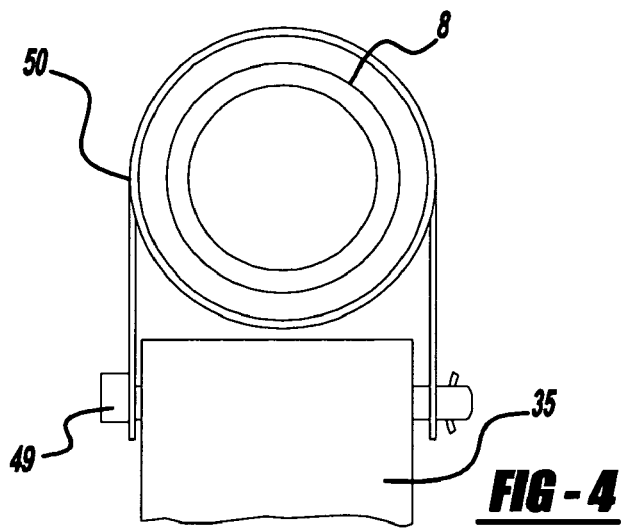
FIG. 4 shows a view of a suspension arrangement.
Figure 5:
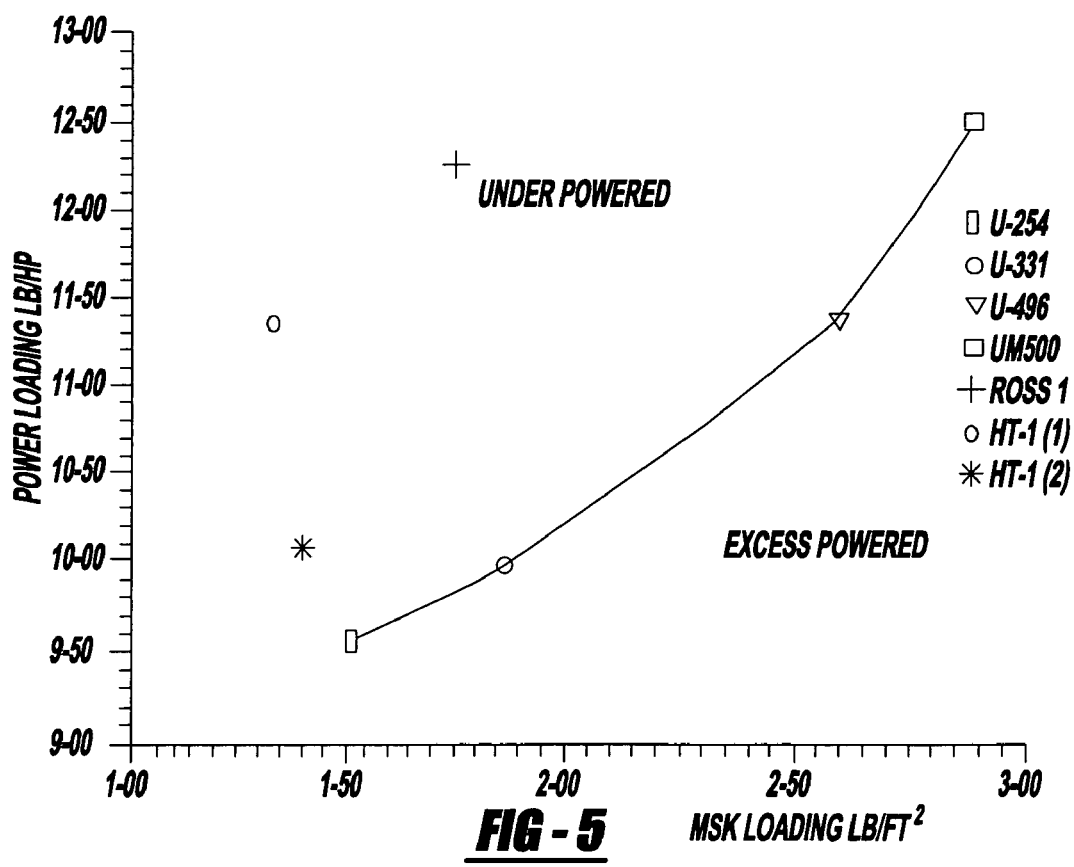
FIG. 5 is a plot of power loading and disk loading of various helicopters.

The secondary gearbox 7 and the engine 3 are mounted below a keel post 8 through flexible mounts 20. The secondary gearbox 7 drives two contra-rotating rotors 9, 10. The keel post 8 also carries a fuel tank 11 and an articulated tail 12. The secondary gearbox 7, as detailed in FIG. 3, houses a pair of concentric shafts 13, 14 connected to bevel gears 15, 16. These bevel gears engage the pinion gear 17, connected through a freewheeling clutch 18 to the engine 3 through the sprag clutch 6 and the flexible coupling 5.

The rotor blades 21 are supported on the concentric shafts 13, 14 through pitch bearings 22 on the teetering plates 23 and teetering hinges 24. Pitch horns 25 on each rotor blade 21 are connected to the star and turnbuckle mechanism 26, which rotates with the rotor blades 21.

Figure 6:
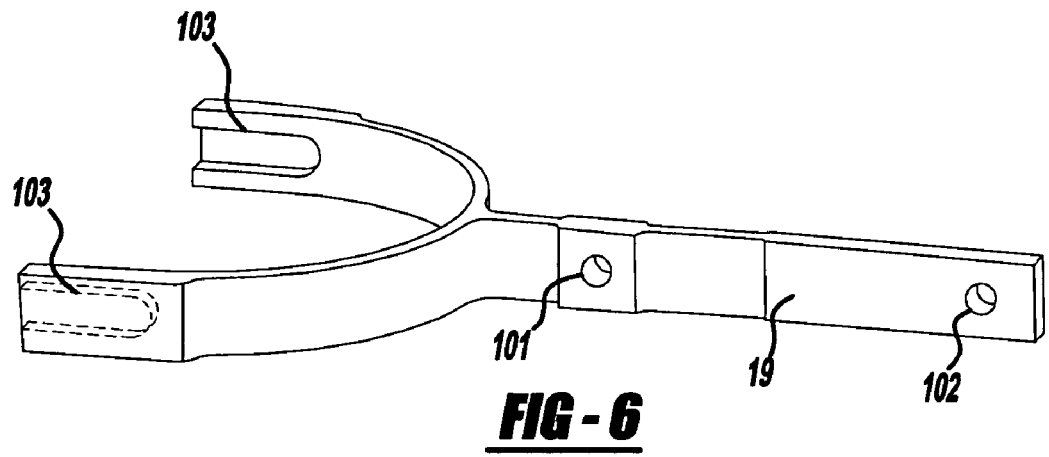
FIG. 6 is a perspective view of a stationary control fork.

With reference to FIGS. 1, 2 and 6, a stationary control fork 19 provides axial movement of the star and turnbuckle mechanism 26, which results in the simultaneous pitch change of the rotor blades 21 under the control of a pilot. The rotary wing assembly 1 is also rigidly connected to the triangular control frame 28, the base of which forms the control bar 29. The control bar 29 has concentric twist grips 30, which are linked to the control fork 19 through flexible cable 31 to enable the change in the pitch angle of the rotor blades 21. The engine 3 is connected to hand throttle lever 32 near the pilot's hand through a flexible throttle cable 33. The tail plane 12 has an articulated lower portion 34, which includes a hinged flap or a plurality or flaps that can be rotated about a horizontal axis for yaw control.

The control bar 29 has a concentric twist grip 30, which is linked to the stationary control fork 19 through flexible cable 31. Selective rotation of the concentric twist grip 30 enables the change in the pitch angle of the rotor blades 21. The stationary control fork 19 provides axial movement of the star and turnbuckle mechanism 26, which results in the simultaneous pitch change of the rotor blades 21 under the control of the pilot.

Figure 7:
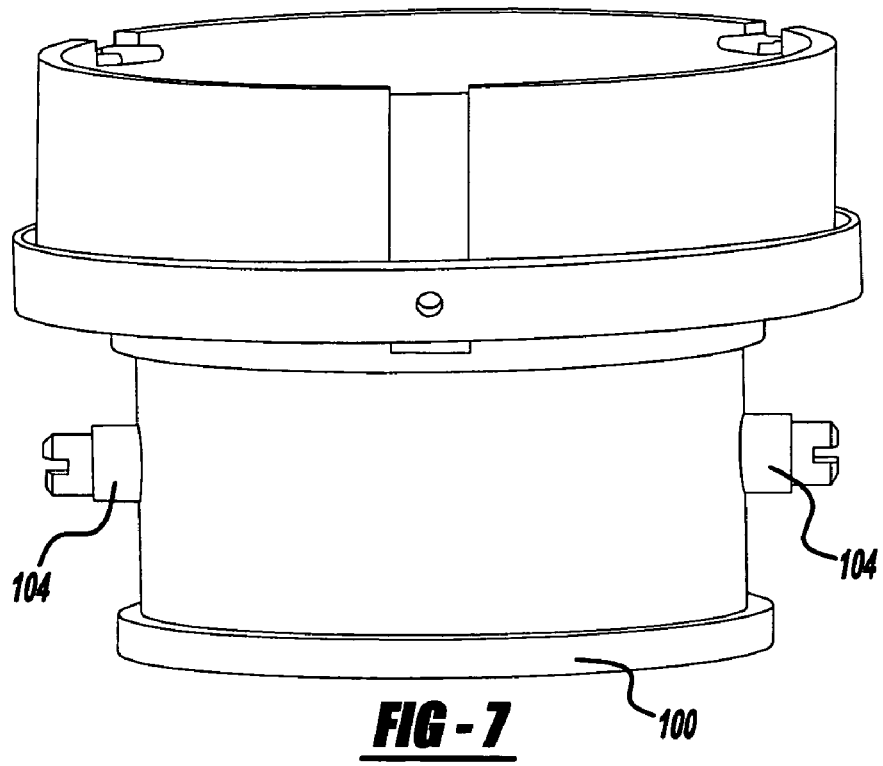
FIG. 7 is perspective view a cup, which is a part of a star and turnbuckle mechanism.
Figure 9:
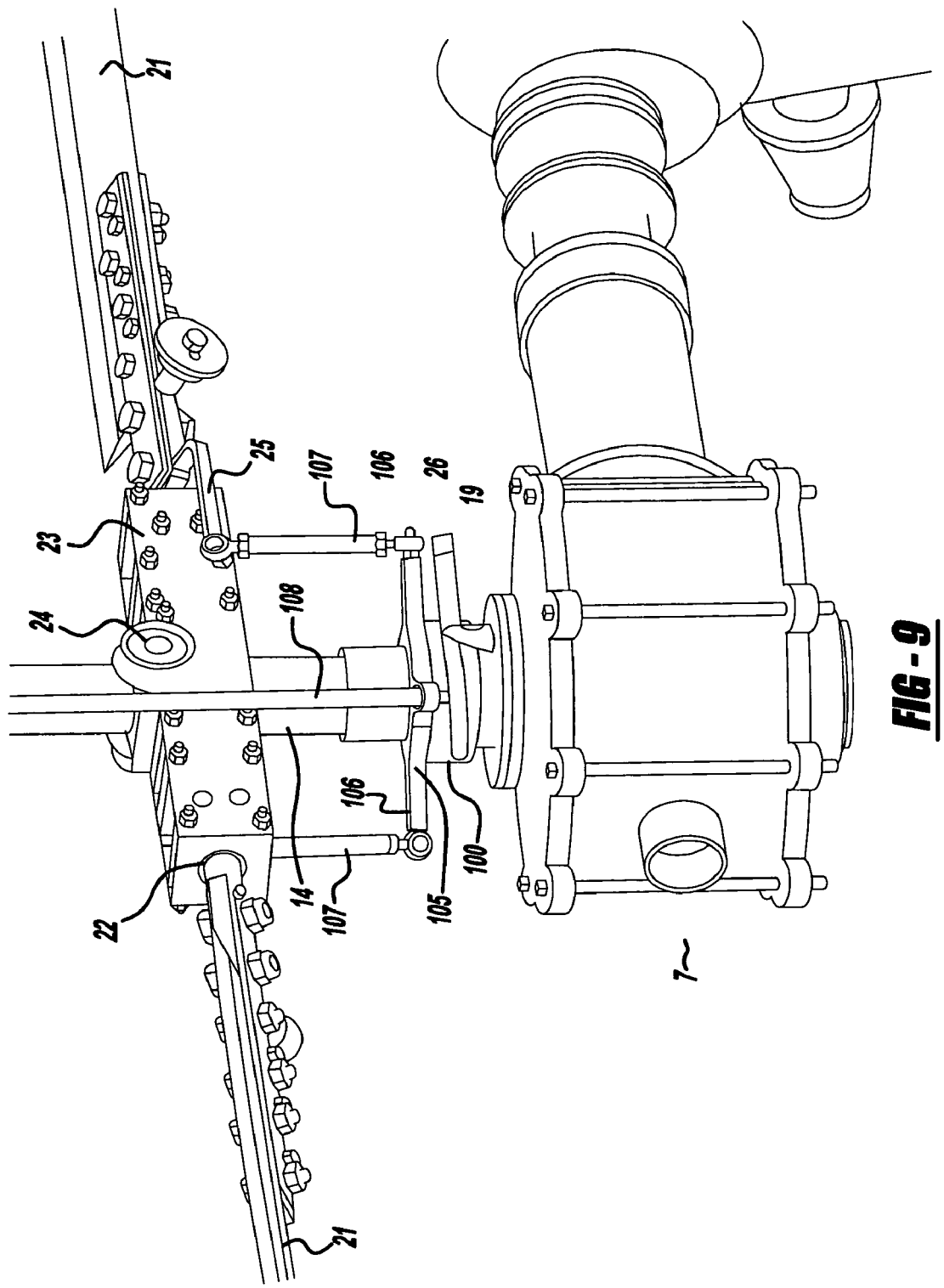
FIG. 9 is a perspective view of an assembly of a secondary gearbox, a star and turnbuckle mechanism, a rotor, rotor blades, pitch bearings, teetering plates, teetering hinges and pitch horn.

With reference to FIGS. 6 and 7, the stationary control fork 19 has a hole 101 on which the stationary control fork 19 pivots and makes limited angular movement when a force is applied through another hole 102 attached to flexible cable 31. The control fork 19 has slots 103, which engage in lugs 104 of the cup 100. The cup is a hollow cylinder that slides on a collar projecting from the secondary gear box 7 (FIG. 1) and concentric with hollow shaft 13 and 14 (FIG. 1). With reference to FIG. 9, the cup 100 also houses a star wheel 105, which can rotate freely but is located axially to move with the cup 100. The two arms 106 of the star wheel 105 are connected to pitch horn 25 of the rotor blade 21 through pitch link 107. The other two arms 106 of the star wheel 105 are connected by fixed link 108 to the upper star wheel for controlling other rotor 10.

Figure 8:
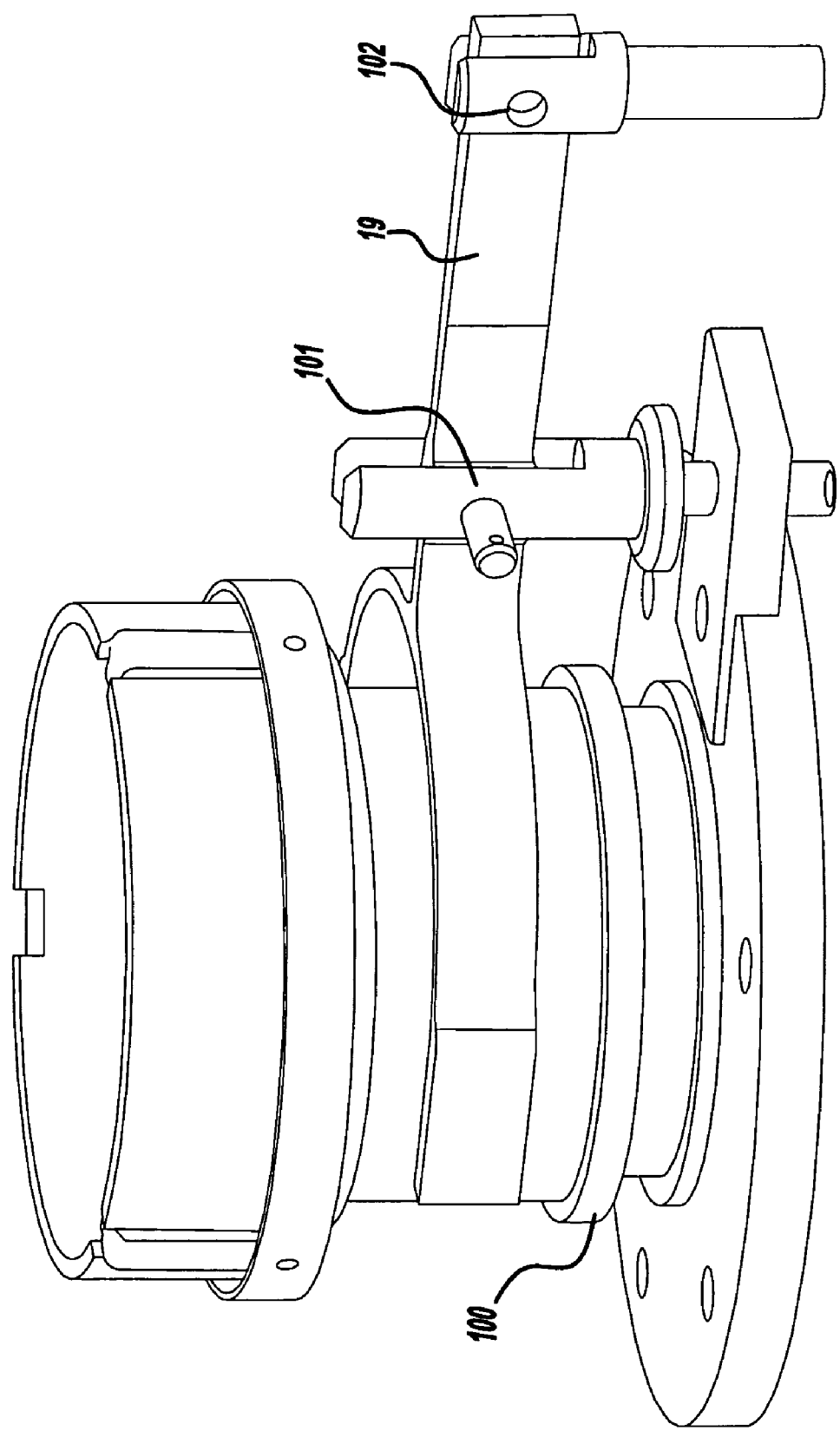
FIG. 8 is a perspective view of an assembly of the stationary control fork and the cup.

With reference to FIGS. 1, 8 and 9, when the pilot applies a control force through his twist grips 30 located on control bar 29 linked to flexible cable 31, the control fork 19 angularly deflects about the axis of hole 101. The angular deflection of the control fork 19 results in axial movement of the cup 100 and consequently that of rotating star wheel 105. Because of the axial movement, the pitch link 107 pushes or pulls the pitch horn 25 resulting in simultaneous change of pitch of all the four rotor blades 21.

In an embodiment of the tricycle assembly 2 of the present invention is shown in the FIGS. 1 and 2 and comprises a triangular frame composed of a vertical beam 35, a horizontal beam 36 and a front tube 37. The horizontal beam 36 supports a front fork 38 in a pivot. The front fork 38 has footrest 39 for the pilot. The front fork 38 attaches to cables 40 that link to the articulated vertical flap 34, such that a rotation of the front fork 38 results in the hinge movement of the articulated vertical flap 34.

More specifically, two coaxial cables 40 are connected between the footrest 39 to the articulated vertical flaps 34, one on the left side and other on the right side. When the pilot steers the front fork 38 with his feet, one of the cables is tensioned and other one slackens thereby causing the movement of the articulated vertical flaps 34 in the tail plane 12 resulting in a yaw movement due to asymmetric position of said flaps, which are acted upon by the downdraft from the rotors 9, 10.

The horizontal tube 36 also supports landing tube 41, which is kept in position through tensioned cables such as 43, 44 and 45. The landing tube 41 and the front fork 38 support tired wheels 46. The pilot is seated in a seat 47 fixed on the horizontal beam 36 and secured firmly through seat belts 48. The tricycle assembly 2 is attached to the rotary wing unit 1 through a hang bolt 49 linking a stirrup 50 overlaying the keel post 8. This arrangement permits the relative movement between the rotary wing unit 1 and the tricycle assembly 2 in the pitch and roll directions. The front fork 38 moves in a bearing located in the horizontal beam 36 in an oblique direction nearly vertical such that it can rotate along the oblique axis when the pilot moves his feet in a steering action.

While this is the suggested configuration, numerous variations on the shape of the trike and wheel support are feasible as is known in construction of powered hang gliders or "trikes."

Method of Operation

Engine Starting

During starting, the engine 3 is automatically disconnected from the rotors because of the sprag clutch 6. The engine 3 is started in a conventional way, using recoil or electric start. As the engine speed picks up, the sprag clutch 6 engages at a particular speed and causes the contra-rotating rotors to rotate, causing a downward thrust. The pilot can adjust the thrust by selection of the engine speed and the blade pitch.

Flying

Flying of the helicopter of the present invention is similar to flying a helicopter as well as flying a powered hang glider ("trike"). With the correct power and collective pitch setting, the helitrike will get into a hover mode. The pilot would make adjustments to the control bar 29 in a pitch direction (i.e., forward and aft movement) which tilts the thrust axis accordingly and also sideways to control the roll movement. To move forward, the control bar 29 is pulled back which causes the thrust axis to point backwards giving a forward thrust.

To turn left, the control bar 29 is pushed to the right. To turn right, the control bar 29 is pushed to the left, much like a powered hang glider. In all these maneuvers, the weight of the pilot and trike provide the reaction force to tilt the thrust axis of the rotors in the required direction. As the net angular momentum of the contra-rotating rotors is zero, the control force required is expected to be small and within the comfort limits of a person.

Yaw control is achieved through manipulation of the tail plane 12 and the articulated lower portion 34 by rotation of the front fork 38 in a similar manner to steering on the ground. As the tail plane 12 is positioned in the downwash of the rotors, adequate yaw control in hover as well as low forward speed is expected. For high forward speeds, the tail plane 12 would "weathercock" into the wind and the articulated lower portion 34 could be placed in a neutral position. Spot turns, an important maneuver for helicopters would be possible with the present system.

In the event of engine failure, the helitrike would get into an auto-rotation mode. This means that the rotors 9, 10 would be free to rotate due to the freewheel 18, and continue to provide lift. It is of course necessary for the pilot to reduce the collective pitch and to go through the autorotation drill as for any conventional helicopter; finally achieving a "flare" or increase in collective pitch to increase the thrust and reduce the rate of descent at touch down.

It is thus expected the helicopter of the present invention would be quite a simple machine to fly, akin to a powered hang glider. Typically, an average student can go solo after about 15-hrs training in a powered hang glider. This is much less than for a regular helicopter training and similar figures may be expected for a helicopter of the present invention. Thus, the helicopter of the present invention could provide an affordable and safe flying machine, with all the advantages of a regular helicopter at a much lower cost.

The determination of the basic dimensions of the helicopter is now discussed. The area of the rotors and the power requirements of the helicopter are obtained from reference to conventional machines of similar performance. It is proposed to design a very light machine that could meet the US "Ultra light" category (FAR Part 103) for which special relaxations are available, such as not requiring a license to fly etc. This requires the empty weight of the aircraft, not to exceed 254 lb (115.3 kg). We may have the following target weights:

Empty weight of aircraft: 115.3 kg (254 lbs)
Pilot Weight 90.0 kg (198.4 lbs)
Fuel 10.0 kg (22 lbs)
All up weight 215.3 kg (474.7 lbs)

The expected performance of a helitrike as described above fitted with a Rotax 447-2V, 40 HP engine operating at 6500 rpm is estimated. Our calculation based on the simple momentum theory described by Seddon in the book on basic helicopter Aerodynamics (1990) indicates a rate of climb in vertical ascent of 4.4 m/s (870 ft/min.). The machine would have a auto-gyration capability which means that in the event of engine failure, the pilot can have a controlled descent by controlling the collective pitch of the rotor blades and a smooth landing could be obtained by "flaring" (i.e., sudden increase of pitch) just before the touch down.

The expected performance of a helitrike as described above fitted with a Rotax 503-2V, 50 hp engine operating at 6200 rpm is estimated. Our calculations indicate a rate of climb of 6.2 m/s (1220 ft per minute). This indicates a good performance and adequate reserve of power to get out of difficult situations such as downdrafts or turbulence. The machine could take off from a small piece of land in a near vertical direction and move forward once a certain height is achieved. The helitrike could execute the routine maneuvers such as spot turns, hover, vertical descent and landing.

In all these above-mentioned maneuvers, the pilot controls the movement of the helicopter mainly through the movement of the control bar 29 in the pilot's hands. By pulling the control bar 29 toward the pilot, the thrust axis of the rotors 9, 10 tilts backwards, thus pushing the helicopter forward. A push of the control bar 29 to the left causes the helicopter to move to the right, and pushing the control bar 29 forward can reduce the forward speed. Thus by shifting the weight of the trike and the pilot relative to the rotary wing assembly, the pilot can simply maneuver the helicopter. For vertical movements the pilot can increase the engine throttle and/or the collective pitch of the rotor blades 9, 10. As the pilot is sitting firmly in a seat, which has only two degrees of freedom, the pilot will not be thrown around due to the rotor down wash. Moreover, with the pilot's feet he can rotate the front fork 38, thereby controlling the tail plane 12 and the articulated lower portion 34 in the direction the pilot wants to go.

The main advantages of the present invention are:

(1) The control and control mechanism of the helicopter are simplified, as there is no cyclic pitch control mechanism as in conventional helicopters and the pilot can control the direction of flight simply by pulling nor pushing of the control bar.

(2) As the pilot is firmly seated in a seat in the trike, which is suspended with only two degrees of freedom, the pilot can easily control the buffeting, which may be experienced in the downwash of the rotors.

(3) As the pilot is seated in a trike, the pilot's feet are available for controlling the front fork and thereby control the yawing motion of the helicopter.

(4) It has all the advantages of a helicopter such as ability to hover, vertical ascent and descent, forward flight etc. at a much lower cost and ease of operation.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A light weight helicopter comprising:
a rotary wing unit having an engine with a primary gearbox being connected through a flexible coupling and a centrifugal clutch to a secondary gear box, said engine, said primary gearbox and said secondary gearbox being mounted below a horizontal keel post using mounting means, said keel post being rigidly attached to a triangular control frame, a base portion of which forms a control bar, said keel post being fixed to a fuel tank and being connected to said engine, said keel post being also provided with a tail plane having one or more articulated vertical flaps capable of being articulated by cable means, said secondary gearbox being provided with a freewheeling clutch, pinion gear and bevel gears capable of transmitting the rotary movement of said engine to two contra-rotating vertical concentric shafts each of which being fixed by a pitch bearing on teetering plates and teetering hinges to horizontal rotors, said horizontal rotors having at least two rotor blades of airfoil cross section capable of pitch change through rotary movement of a pitch horn, said pitch horn on each rotor blade being connected to a star and turnbuckle mechanism and a stationary control fork, said rotary wing unit being attached to a tricycle assembly through a landing gear and provided with means for control of the said engine, rotors, tail plane and landing gear, said tricycle assembly having a triangular frame composed of a rear beam, a horizontal beam and a front tube, said horizontal beam supporting a front fork in a pivot, said front fork being provided with footrest for the pilot, said front fork being attached to cables linking to said articulated vertical flap, such that the rotation of said front fork results in the hinge movement of said articulated vertical flap, said horizontal tube also supporting a plurality of landing gear tubes, which are kept in position through tensioned cables, said landing tubes and the front fork supporting landing gear, the pilot being seated in a seat fixed on the said horizontal beam and secured firmly to the seat through seat belts.

2. The lightweight helicopter of claim 1 wherein said engine is selected from a group consisting of a two-stroke reciprocating petrol engine and a Wankel rotary engine.

3. The lightweight helicopter of claim 1 wherein said triangular control frame articulates said rotary wing unit through a control bar held by the pilot.

4. The lightweight helicopter of claim 1 wherein said means for activating the change in rotor blade mean pitch is a rotatable twist grip located on the control bar and controlled by the pilot.

5. The lightweight helicopter of claim 1 wherein said landing gear is selected from a group consisting of tired wheels, skids and floats.

6. A light weight helicopter comprising:
a rotary wing unit having an engine with a primary gearbox being connected through a flexible coupling and a centrifugal clutch to a secondary gear box;
a horizontal keel post mounted above said engine, said primary gearbox and said secondary gearbox, said keel post being rigidly attached to a triangular control frame;
a base portion of said triangular control frame forms a control bar;
a tail plane coupled to said keel post having one or more articulated vertical flaps selectively articulated by cable means;
a freewheeling clutch coupling said engine to two contra-rotating vertical concentric shafts;
horizontal rotors having at least two rotor blades, said horizontal rotors;
teetering plates and teetering hinges coupling said horizontal rotors to said two contra-rotating vertical concentric shafts; and
a tricycle assembly having a triangular frame composed of a rear beam, a horizontal beam and a front tube, said horizontal beam supporting a front fork in a pivot, said front fork being provided with footrest for the pilot, said tricycle assembly coupled to said rotary wing unit, said front fork coupled to said articulated vertical flap, such that the rotation of said front fork results in the hinge movement of said articulated vertical flap.

* * * * *